United States Patent [19]
Mitcham

[11] Patent Number: 5,886,449
[45] Date of Patent: Mar. 23, 1999

[54] ELECTRICAL MACHINE

[75] Inventor: Alan J Mitcham, Northumberland, England

[73] Assignee: Rolls-Royce Power Engineering plc, Newcastle Upon Tyne, England

[21] Appl. No.: 694,427

[22] Filed: Aug. 8, 1996

[30] Foreign Application Priority Data

Aug. 11, 1995 [GB] United Kingdom .................... 9516475

[51] Int. Cl.$^6$ ...................................................... H02K 1/22
[52] U.S. Cl. ............................................. 310/254; 310/266
[58] Field of Search .................... 310/162, 164, 310/266, 114, 254

[56] References Cited

U.S. PATENT DOCUMENTS

| | | | |
|---|---|---|---|
| 567,423 | 9/1896 | Thury | 310/164 |
| 630,333 | 8/1899 | Dietrich | 310/164 |
| 3,181,020 | 4/1965 | Welter | 310/164 |
| 3,230,405 | 1/1966 | Sorensen | 310/94 |
| 3,700,942 | 10/1972 | Alth | 310/164 |
| 3,719,842 | 3/1973 | Kuntz | 310/164 |
| 3,786,291 | 1/1974 | Sidell | 310/162 |
| 4,658,166 | 4/1987 | Oudet | 310/162 |
| 4,891,538 | 1/1990 | Oudet | 310/162 |
| 5,051,641 | 9/1991 | Weh | 310/162 |
| 5,289,072 | 2/1994 | Lange | 310/266 |

FOREIGN PATENT DOCUMENTS

| | | |
|---|---|---|
| C 4138014 | 2/1993 | Germany . |
| A 19507233 | 10/1995 | Germany . |
| A 4430139 | 2/1996 | Germany . |
| 9504399 | 2/1995 | WIPO . |

*Primary Examiner*—Clayton LaBalle
*Attorney, Agent, or Firm*—Farkas & Manelli PLLC; W. Taltavull

[57] ABSTRACT

An electrical machine has a rotor shaft which carries a plurality of rotor discs for rotation therewith. Each rotor disc has two pairs of rotor rims secured thereto. Each rotor rim consists of a single row of alternate magnets and pole pieces and is opposed by a series of stator cores which straddle the rotor rim. The stator cores are 'c' shaped so that they receive flux from two adjacent magnets and close around two opposite rotor poles on either side of the rotor rim. The stator cores, formed by winding electrical steel around a former, reduce the losses caused by eddy currents generated when flux impinges on the side faces of the stator core.

5 Claims, 4 Drawing Sheets

ELECTRICAL MACHINE

FIELD OF THE INVENTION

The present invention relates to an electrical machine and in particular to a synchronous machine which operates in accordance to transverse flux principles.

BACKGROUND OF THE INVENTION

A synchronous machine operating in accordance with transverse flux principles consists of an armature winding in the form of a circular coil co-axial with a rotor. The armature winding links the flux generated by permanent magnets mounted on the rim of the rotor by means of a series of stator cores. An advantage of this topology is that the section of the stator cores can be increased so that more flux can be carried without encroaching on the space required by the armature winding.

In previous designs of transverse flux machines the rotor rims carry two side by side rows of permanent magnets separated by an insulating spacer. Two circular stator coils are used and stator cores are incorporated on both the inside and the outside of the rotor so that useful torque is provided at both the inner and outer surfaces of the rotor.

Problems with machines of this design are that they are difficult to assemble as the stator coils are enclosed within the stator cores. The rotor rims are long and lack stiffness and the rotor is subject to deflections as it has little stiffness against radial force. The radial force on the stator cores as the flux alternates causes radial movement of the stator casing. This zero order stator case vibration is difficult to alleviate without adding thickness to the casing.

SUMMARY OF THE INVENTION

The present invention seeks to provide an improved topology having simplified stator cores.

According to the present invention an electrical machine comprises a rotor including a rotor shaft for rotation about an axis and at least one rotor disc extending therefrom for rotation therewith, the rotor disc has at least one pair of circumferential rotor rims secured thereto, the rims in each pair are secured at the same radial location on opposite sides of the rotor disc, each rotor rim consists of a single row of alternate magnets and pole pieces, each rotor rim is opposed by a stator assembly which comprises stator cores which are shaped to define a pair of ends disposed adjacent and facing the rotor rim, the ends are spaced a single rotor pole pitch apart to close around two adjacent rotor pole pieces on either side of the rotor rim, whereby in operation each end of the stator core receives flux from two adjacent magnets, the flux from the two adjacent magnets is fed to the ends of the stator core by short and long flux paths, armature windings being disposed within the stator cores for operably exciting said stator.

In the preferred embodiment of the present invention the stator cores are of a generally C shape and may be formed from wound electrical steel.

Preferably the ends of the stator cores are profiled to reduce armature leakage and the stator cores are inclined to equalise the angle on each side of the profiled ends.

Multiple pairs of rims and stator assemblies may be placed on each rotor disc, the rims in each pair are secured at the same radial location on opposite sides of the rotor disc.

BRIEF DESCRIPTION OF THE DRAWINGS

The present invention will now be described with reference to the accompanying drawings in which.

DETAILED DESCRIPTION OF THE INVENTION

Figure 1:
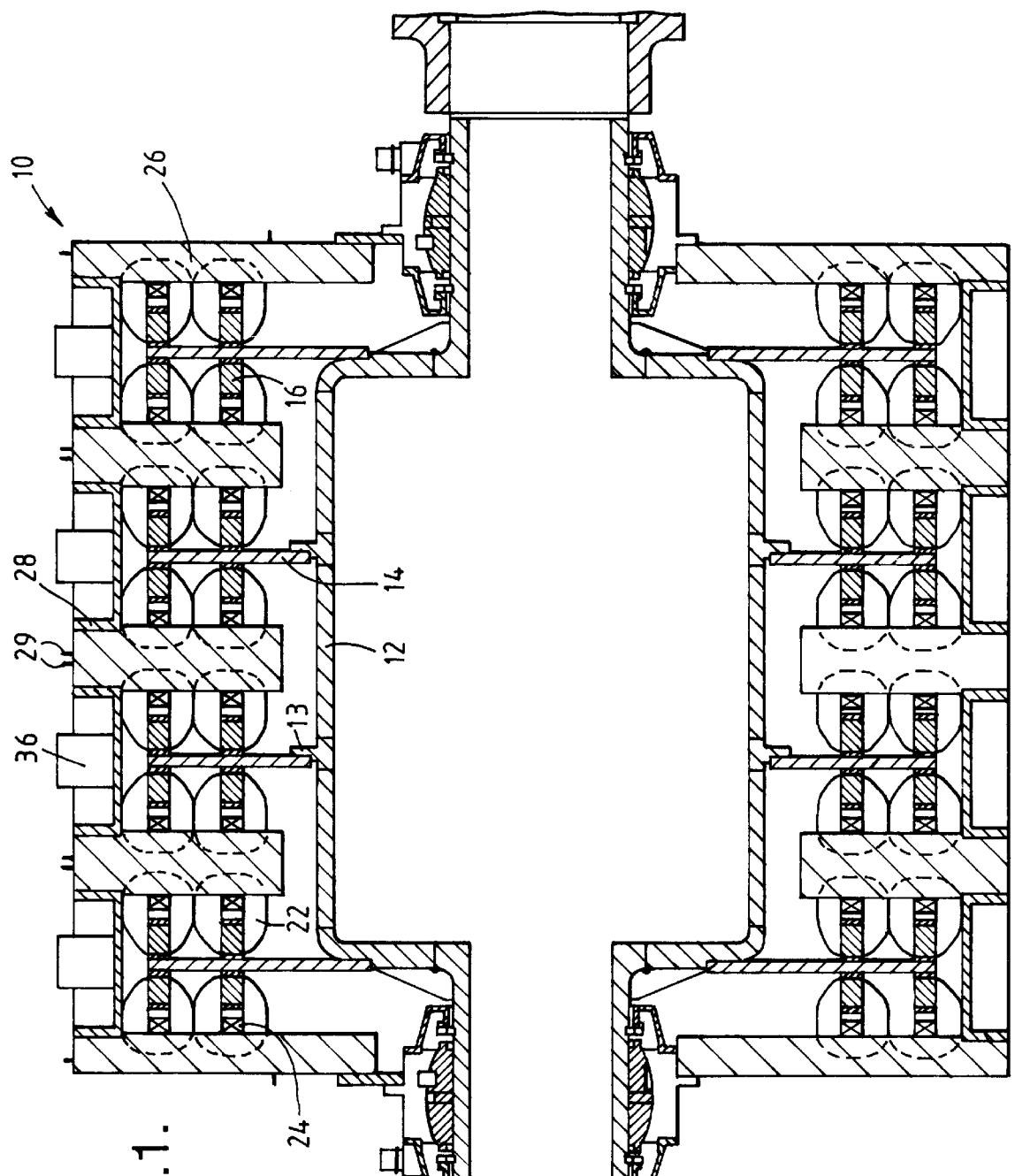
FIG. 1 is a cross-sectional view of a transverse flux motor in accordance with the present invention.

Referring to FIG. 1 a transverse flux motor, generally indicated at 10 comprises a rotor and a stator assembly.

The rotor assembly has four rotor discs 14 bolted to flanges 13 on a hollow shaft 12. Each disc 14 has four circumferential rotor rims 16 which support the active rotor components for four motor phases. The rims 16 consist of single rows of alternate laminated pole pieces 18 and permanent magnets 20.

Suitable magnet materials are the high energy rare earth magnet materials such as samarium cobalt and neodymium iron boron. The magnets are subdivided to limit eddy currents therein.

Figure 2:
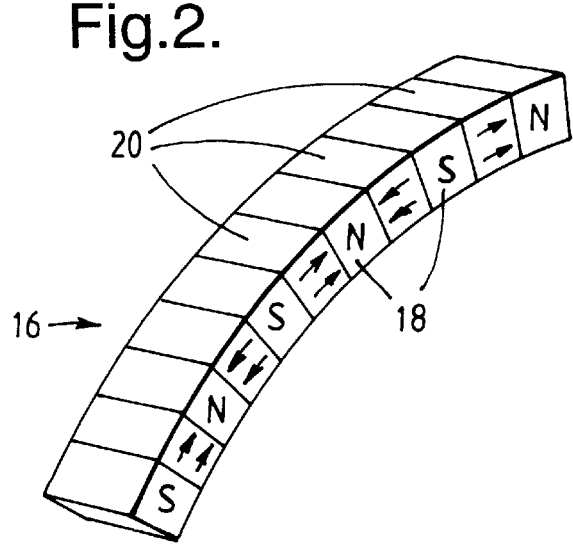
FIG. 2 is an enlarged view of part of one of the rotor rims shown in FIG. 1.

The magnets 20 are orientated in the circumferential direction as shown in FIG. 2 so that the flux from two of the magnets 20 is concentrated into a single pole piece 18. The pole pieces 18 consist of laminations held in compression by bolts (not shown).

Opposing each rotor rim 16 are a series of stator cores 22. A coil 24 is disposed between the stator cores 22 around the rim 16 of the rotor. The coil 24 and stator cores 22 are supported in a stator frame. The stator frame consists of stator discs 26 which are flanged and bolted to a housing 28. The stator cores 22 are located in slots in the stator discs 26. The stator discs 26 are made from aluminium and have a high thermal conductivity to remove heat. A coolant such as water is provided for cooling purposes through the cooling connections 29.

Figure 3:
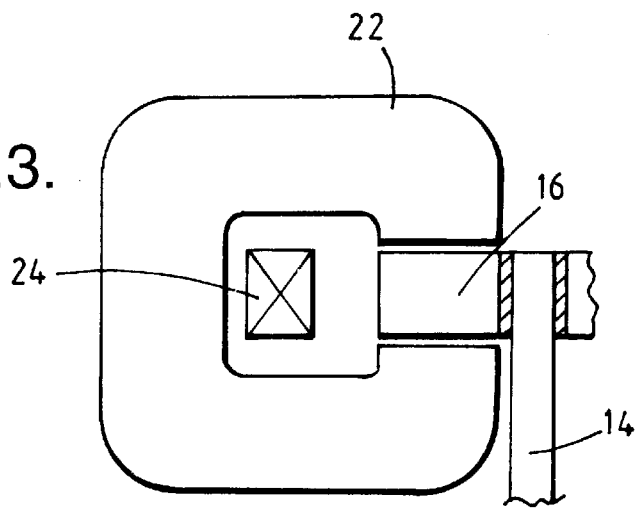
FIG. 3 shows the arrangement of a single motor phase.

The stator cores 22 are C shaped, FIG. 3, and are arranged so that they can receive flux from two adjacent magnets 20 to give the required flux concentration. The stator cores 22 or the magnets 20 on the rotor rim 16 are skewed in such a way that each stator core 22 closes around adjacent pole pieces 18.

Figure 4:
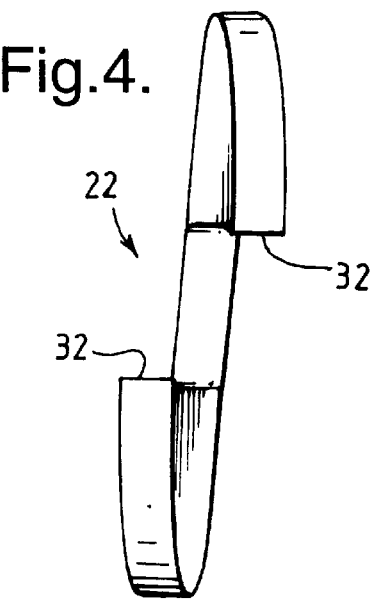
FIGS. 4 and 5 show alternative designs of stator cores for use in a transverse flux motor in accordance with the present invention.
Figure 5:
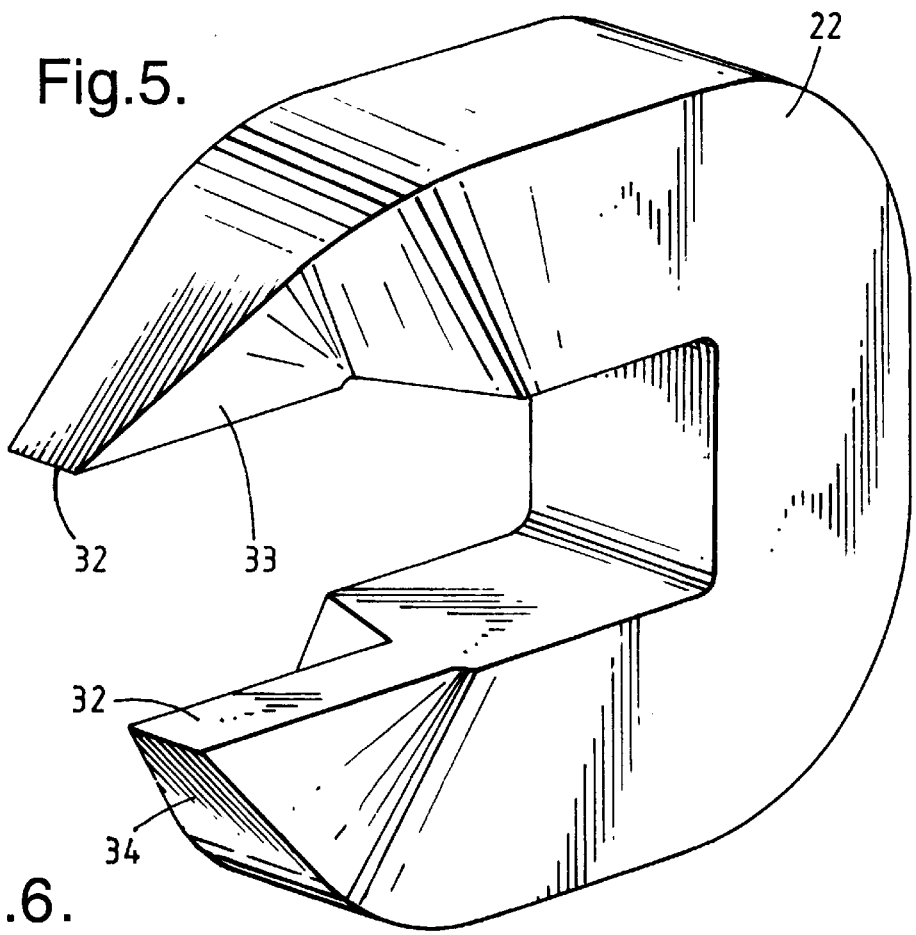

FIGS. 4 and 5 show different stator core 22' designs which have a geometry as described. In the preferred embodiment of the present invention the stator cores are asymmetric, as shown in FIG. 5.

Figure 6:
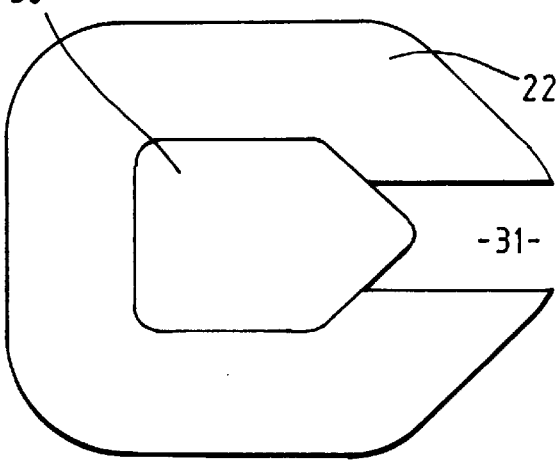
FIG. 6 shows a shaped former used to form a stator core as shown in FIG. 5.

The asymmetric stator cores 22' are formed by winding adhesively bonded electrical steel strip onto a former 30 which is then cured. The former 30, shown in FIG. 6, has a nose angle of the order of 45° and the cured stator core 22 is cut to form an opening 31 at the nose. The ends 32 of the stator core 22 are staggered, by a single rotor pole pitch, by putting chamfers 33 and 34 on opposite sides of each of the ends 32, FIG. 5.

The wound asymmetric stator cores 22 offer the advantage that losses due to eddy currents generated when the flux impinges on the side faces of the stator cores 22 is minimized. The asymmetric shape is relatively easy to manufacture and the angled nose of the stator core 22 helps to minimize armature leakage. The angled nose allows the thickness of the stator core 22 to be reduced. Although the thickness of the stator core 22 is reduced at the angled nose the area of the stator core 22 is increased to span two rotor pole pieces hence flux saturation of the stator core 22 can be avoided.

Figure 7:
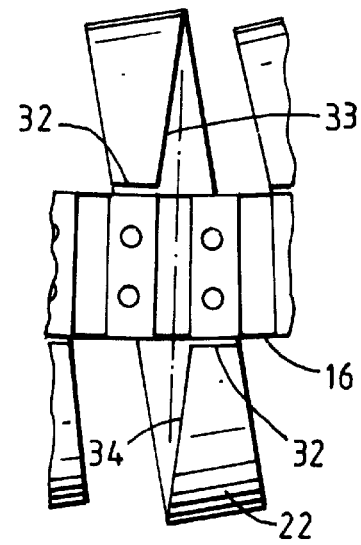
FIG. 7 shows an inclined stator core.

The stator core 22 can be inclined as shown in FIG. 7. Inclining the stator core 22 at a suitable angle in the stator frame 28 allows some reduction in the width of the stator core 22 and equalises the taper angle on each side of the pole pieces 32.

In operation an alternating current passes from terminal boxes 36 mounted on the stator frame 28 through the coils 24 to produce a rotating magnetic field. The rotor rotates as the magnets 20 follow the rotating magnetic field. The torque generated by each coil 24 is typically sinusoidal and falls to zero as the poles 20 and 32 attract. To give a smooth steady torque multiple phases are required. The multiple phases are provided generally by way of multiple discs and/or multiple phases per disc. The phases are arranged to give complementary torque so that the sinusoidal torque ripple cancels out.

Figure 8:
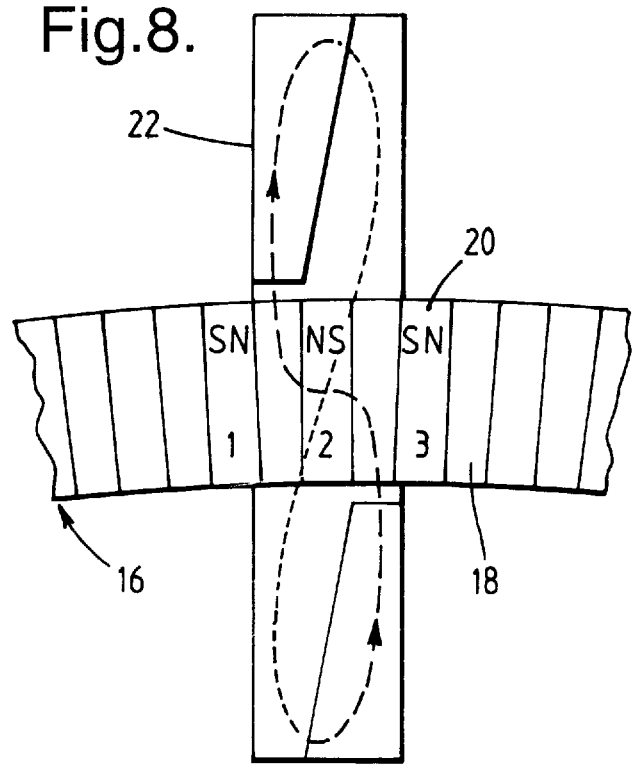
FIG. 8 shows the short path flux thorough a stator core in accordance with the present invention.
Figure 9:
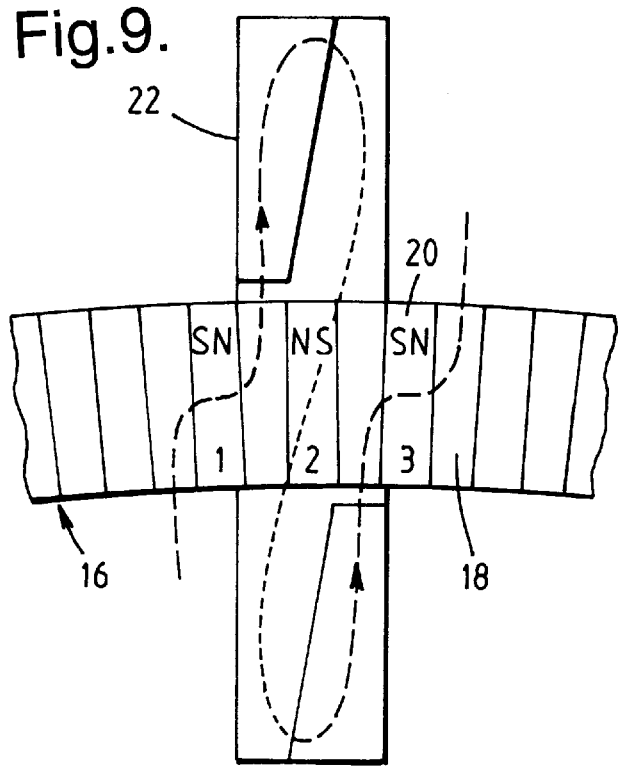
FIG. 9 shows the long path flux through a stator core in accordance with the present invention.

The flux that feeds the upper limb of the stator core 22 consists of the short path flux which is produced by magnet number 2 in FIG. 8 and also the long flux path which is produced by magnet number 1. The funnelling of the flux relies on both magnets 1 and 2 being able to feed the upper limb of the stator core 22. However whilst the short path flux consists of a local flux loop which simply links the armature winding 24 via a single stator core 22 the long flux path links all the odd numbered magnets including magnets 1 and 3 as shown in FIG. 9. The long path flux thus links all the stator cores 22 and all the odd numbered magnets 20 to form a complete flux loop around the circumference of the rotor. In normal operation the long flux path will alternate around the machine (clockwise and anticlockwise).

Each stator core 22 receives flux from two adjacent magnets. The flux is fed to the stator core 22 by the short and long path flux. The presence of the long path flux allows the use of a stator core 22 having a simplified geometry in accordance with the present invention.

Although the present invention has been described with reference to a rotor carrying four discs 14, each disc 14 in turn having four rims 16, it will be appreciated by one skilled in the art that any number of discs 14 or pairs of rims 16 could be used in a motor in accordance with the present invention. Multiple pairs of rims 16 could be carried by each disc 14 to increase the torque available from a given disc diameter.

A motor constructed in accordance with the present invention offers a number of advantages over conventional motor designs. It is easier to manufacture as the stator frame 26 and the stator cores 22 can be built up as a complete sub-assembly before fitting the stator coils 24. The coils 24 are easier to wind and connect since there is easy access to the side faces of the coils 24. The rotor rim 16 comprises a single row and is considerably shortened. Some reduction in the overall length of the motor is achievable and the stator frame 28 consists of a substantial structure with each phase of the stator supported by deep flanges. The flanges have sufficient radial depth to give enough structural stiffness to resist distortion under radial shock. As the stator frame 26 and 28 is not subject to any net radial pull due to magnetic loading in the air gap the frame is not subject to the zero order stator frame vibration.

I claim:

1. An electrical machine comprising a rotor including a rotor shaft for rotation about an axis and at least one disc extending from the rotor shaft for rotation therewith, the rotor disc having at least one pair of circumferential rotor rims secured to the rotor disc, the rims in each pair being secured at the same radial location on opposite sides of the rotor disc, each rotor rim comprising a single row of alternate magnets and pole pieces, said magnets being polarized in a circumferential direction about said axis, each rotor rim being opposed by a stator assembly comprising stator cores which are C-shaped to define a pair of ends disposed adjacent and facing the rotor rim, the ends being spaced a single rotor pole pitch apart to close around two adjacent rotor pole pieces on either side of the rotor rim, whereby in operation each end of the stator core receives flux from two adjacent magnets, the flux from the two adjacent magnets is fed to the ends of the stator core by short and long flux paths, armature windings being disposed within the stator cores for operably exciting said stator.

2. An electrical machine as claimed in claim 1 in which the ends of the stator cores are profiled to reduce armature leakage.

3. An electrical machine as claimed in claim 2 in which the stator cores have profiled ends extending at an angle and said cores are inclined to equalize the angle on each side of the profiled ends.

4. An electrical machine as claimed in claim 1 in which each disc carries multiple pairs of rims, the rims in each pair being secured at the same radial location on opposite sides of the rotor disc.

5. An electrical machine as claimed in claim 1 in which the stator cores are formed by winding an electrical steel strip about a former.

* * * * *